US 11,442,510 B2

(12) United States Patent
Li et al.

(10) Patent No.: US 11,442,510 B2
(45) Date of Patent: Sep. 13, 2022

(54) HINGE, ELECTRONIC DEVICE, AND ELECTRONIC DEVICE CONTROL METHOD

(71) Applicant: VIVO MOBILE COMMUNICATION CO., LTD., Guangdong (CN)

(72) Inventors: Lele Li, Chang'an Dongguan (CN); Yalei Song, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 17/211,561

(22) Filed: Mar. 24, 2021

(65) Prior Publication Data

US 2021/0208640 A1 Jul. 8, 2021

Related U.S. Application Data (63) Continuation of application No. PCT/CN2019/099925, filed on Aug. 9, 2019.

(30) Foreign Application Priority Data

Sep. 26, 2018 (CN) .......................... 201811122738.X (51) Int. Cl.
*G06F 1/16* (2006.01)
(52) U.S. Cl.
CPC .......... *G06F 1/1681* (2013.01); *G06F 1/1616* (2013.01); *G06F 1/1683* (2013.01); *G06F 1/1684* (2013.01)
(58) Field of Classification Search
CPC .................................................... G06F 1/1652
See application file for complete search history.

(56) References Cited

U.S. PATENT DOCUMENTS

| 6,421,235 | B2 * | 7/2002 | Ditzik | G06F 1/1669 |
| | | | | 361/679.3 |
| 9,506,279 | B2 * | 11/2016 | Kauhaniemi | H04M 1/0216 |
| 9,811,119 | B2 * | 11/2017 | Seo | H04M 1/0216 |
| 9,818,961 | B2 * | 11/2017 | Hiroki | H01L 51/525 |
| 9,898,051 | B2 * | 2/2018 | Cho | G06F 1/1652 |
| 9,927,841 | B2 * | 3/2018 | Gheorghiu | E05D 11/0054 |
| 10,019,036 | B2 * | 7/2018 | Sun | G06F 1/1652 |
| 10,209,743 | B1 * | 2/2019 | Hsu | G06F 1/1681 |

(Continued)

FOREIGN PATENT DOCUMENTS

| CN | 107067976 A | 8/2017 |
| CN | 206596050 U | 10/2017 |

(Continued)

OTHER PUBLICATIONS

Written Opinion of the International Searching Authority dated Apr. 8, 2021 as received in Application No. PCT/CN2019/099925.

(Continued)

*Primary Examiner* — Adrian S Wilson
(74) *Attorney, Agent, or Firm* — Maschoff Brennan (57) ABSTRACT

A hinge, an electronic device, and an electronic device control method are provided. The electronic device control method includes: when detecting that an electrical signal changes, obtaining a first electrical signal between a first metal plate and a second metal plate; and determining a first folding angle of a hinge according to the first electrical signal; and controlling the electronic device according to the first folding angle.

12 Claims, 4 Drawing Sheets

(56) References Cited

U.S. PATENT DOCUMENTS

| | | | |
|---|---|---|---|
| 10,310,566 B2* | 6/2019 | Liao | H04M 1/02 |
| 11,157,100 B2* | 10/2021 | Park | G06F 3/041 |
| 2007/0117600 A1* | 5/2007 | Robertson | G06F 1/1681 |
| | | | 455/575.1 |
| 2011/0077062 A1 | 3/2011 | Kim et al. | |
| 2012/0307423 A1* | 12/2012 | Bohn | H04M 1/0216 |
| | | | 361/679.01 |
| 2013/0216740 A1* | 8/2013 | Russell-Clarke | B23K 26/38 |
| | | | 219/121.72 |
| 2014/0217875 A1* | 8/2014 | Park | G06F 1/1681 |
| | | | 16/354 |
| 2015/0077917 A1* | 3/2015 | Song | G06F 1/1652 |
| | | | 361/679.27 |
| 2015/0176317 A1* | 6/2015 | Lee | G06F 1/1681 |
| | | | 16/251 |
| 2016/0139634 A1* | 5/2016 | Cho | G06F 1/1652 |
| | | | 16/366 |
| 2016/0187935 A1* | 6/2016 | Tazbaz | G06F 1/1681 |
| | | | 361/679.55 |
| 2016/0224072 A1* | 8/2016 | Huang | G06F 1/1681 |
| 2017/0142847 A1 | 5/2017 | Park | |
| 2017/0227994 A1* | 8/2017 | Hsu | E05D 3/06 |
| 2017/0272559 A1 | 9/2017 | Cavallaro et al. | |
| 2017/0285688 A1* | 10/2017 | Sun | G06F 1/1681 |
| 2018/0077810 A1* | 3/2018 | Moon | G06F 1/1652 |
| 2018/0092223 A1* | 3/2018 | Hsu | H04M 1/0268 |
| 2018/0183911 A1 | 6/2018 | Lee et al. | |
| 2018/0373297 A1* | 12/2018 | Liao | G06F 1/1681 |
| 2019/0034143 A1* | 1/2019 | Wu | G06F 1/163 |

FOREIGN PATENT DOCUMENTS

| | | |
|---|---|---|
| CN | 206596060 U | 10/2017 |
| CN | 109189305 A | 1/2019 |

OTHER PUBLICATIONS

Indian Office Action dated May 19, 2022 as received in application No. 202127017145.

* cited by examiner

HINGE, ELECTRONIC DEVICE, AND ELECTRONIC DEVICE CONTROL METHOD

CROSS-REFERENCE TO RELATED APPLICATIONS

This application is a continuation application of PCT Application No. PCT/CN2019/099925 filed on Aug. 9, 2019, which claims priority to Chinese Patent Application No. 201811122738.X, filed on Sep. 26, 2018 in china, disclosures of which are incorporated herein by reference in their entireties.

TECHNICAL FIELD

The present disclosure relates to the field of communications technologies, and in particular, to a hinge, an electronic device, and an electronic device control method.

BACKGROUND

With the rapid development of electronic devices, electronic devices provide more and more functions. In addition, screens of electronic devices also become increasingly large. To conveniently carry electronic devices with large screens, screens of some electronic devices can be folded. At present, two screens of an electronic device are mainly connected through a hinge, and a folding operation of the screen is performed through the hinge. However, the electronic device in the related technology cannot measure a folding angle in a screen folding process, and the electronic device cannot be controlled and managed according to the folding angle of the folding operation. As a result, the application scope of controlling and managing the electronic device through the folding operation is relatively small.

As can be seen, in the related technology, because the folding angle of the folding operation cannot be measured, there is a problem that the application scope of controlling and managing the electronic device through the folding operation is relatively limited.

SUMMARY

According to a first aspect, the embodiments of the present disclosure provide a hinge, including N sleeves that are jointed, where any two adjacent sleeves of the N sleeves may be sheathed together, and N is a positive integer greater than or equal to 2.

A first side wall of a first sleeve is provided with a first metal plate, a second side wall of a second sleeve is provided with a second metal plate, and the first sleeve and the second sleeve are two adjacent sleeves.

When the first sleeve and the second sleeve are sheathed, the first side wall is opposite to the second side wall and the first metal plate is opposite to the second metal plate, and the first metal plate and the second metal plate have overlapped orthogonal projection areas.

An electrical signal is applied to at least one of the first metal plate and the second metal plate. When the first sleeve and the second sleeve move relative to each other, an electrical signal between the first metal plate and the second metal plate changes.

According to a second aspect, the embodiments of the present disclosure further provide an electronic device, including a first substrate, a second substrate, and the foregoing hinge, where the first substrate and the second substrate are connected through the foregoing hinge.

According to a third aspect, the embodiments of the present disclosure further provide an electronic device control method, applied to the foregoing electronic device. The method includes:

when detecting that an electrical signal changes, obtaining a first electrical signal between a first metal plate and a second metal plate; determining a first folding angle of a hinge according to the first electrical signal; and controlling the electronic device according to the first folding angle.

BRIEF DESCRIPTION OF DRAWINGS

To describe the technical solutions in the embodiments of the present disclosure more clearly, the following briefly describes the accompanying drawings required in the embodiments of the present disclosure. Apparently, the accompanying drawings in the following descriptions show merely some embodiments of the present disclosure, and a person of ordinary skill in the art may still derive other drawings from these accompanying drawings without creative efforts.

DETAILED DESCRIPTION OF EMBODIMENTS

The following clearly and completely describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

In the embodiments of the present disclosure, a hinge includes N sleeves that are jointed, where any two adjacent sleeves of the N sleeves may be sheathed together, and N is a positive integer greater than or equal to 2. A first side wall of a first sleeve is provided with a first metal plate, a second side wall of a second sleeve is provided with a second metal plate, and the first sleeve and the second sleeve are two adjacent sleeves. When the first sleeve and the second sleeve are sheathed, the first side wall is opposite to the second side wall and the first metal plate is opposite to the second metal plate, and the first metal plate and the second metal plate have overlapped orthogonal projection areas. An electrical signal is applied to at least one of the first metal plate and the second metal plate. When the first sleeve and the second sleeve move relative to each other, an electrical signal between the first metal plate and the second metal plate changes.

Figure 1:
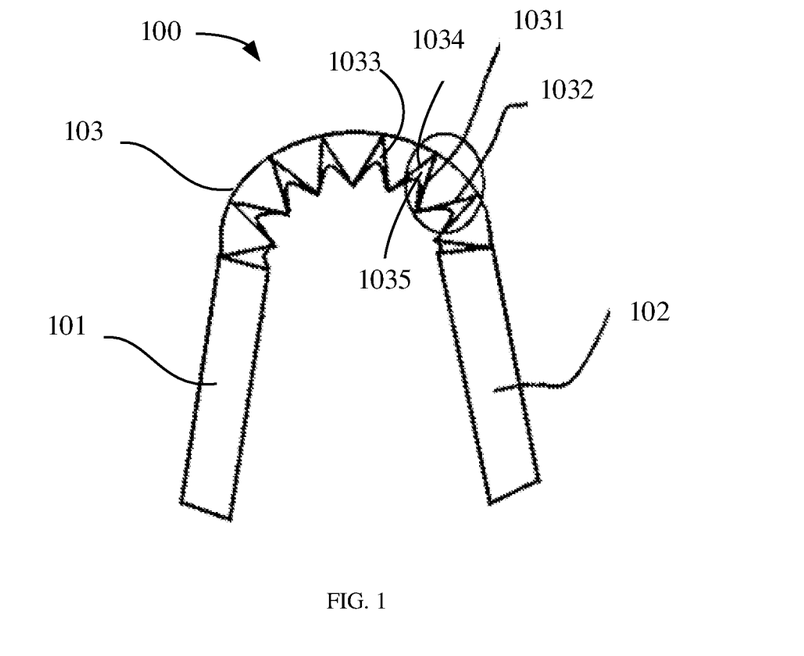
FIG. 1 is a first structural diagram of a foldable screen according to an embodiment of the present disclosure.

Specifically, referring to FIG. 1, FIG. 1 is a structural diagram of a foldable screen according to an embodiment of the present disclosure. As shown in FIG. 1, a foldable screen 100 includes a first screen 101, a second screen 102, and a hinge 103. The first screen 101 and the second screen 102 are connected through the hinge 103. The hinge 103 extends, so that the first screen 101 and the second screen 102 may be in a folded state. The hinge 103 contracts, so that the first screen 101 and the second screen 102 may be in an extended state. As shown in FIG. 1, when the hinge 103 extends, the first screen 101 and the second screen 102 are in the folded state.

The hinge 103 shown in FIG. 1 is provided with N sleeves, the N sleeves include a first sleeve 1031 and a second sleeve 1032, the first sleeve 1031 and the second sleeve 1032 are two adjacent sleeves that are sheathed together, the first sleeve 1031 may be provided with a first metal plate, and the second sleeve 1032 may be provided with a second metal plate.

As shown in FIG. 1, the N sleeves of the hinge 103 further include a third sleeve 1033 and a fourth sleeve 1034, the third sleeve 1033 and the fourth sleeve 1034 are two adjacent sleeves that are sheathed together, the third sleeve 1033 may be provided with a third metal plate, and the fourth sleeve 1034 may be provided with a fourth metal plate. There may be a gap 1035 between the fourth sleeve 1034 and the first sleeve 1031.

Figure 2:
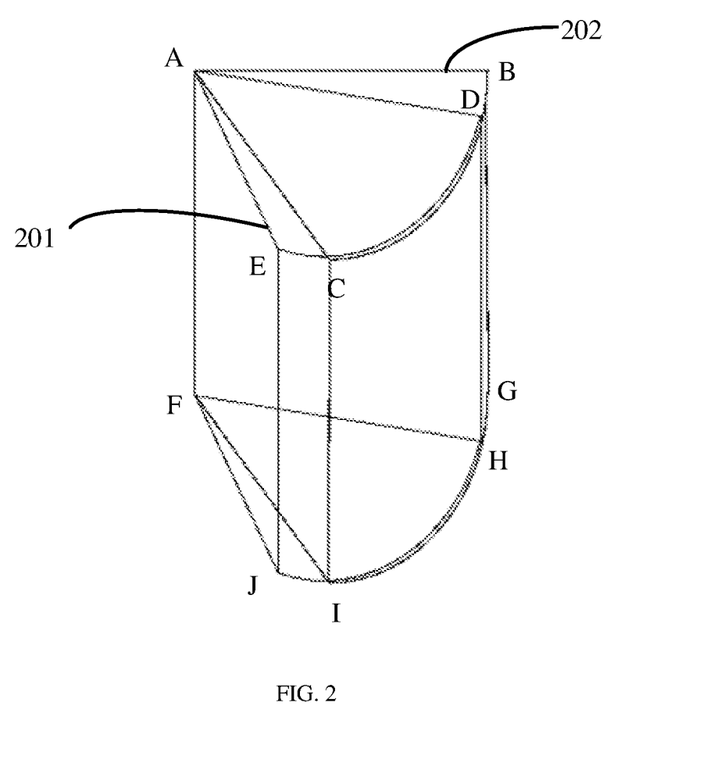
FIG. 2 is a first schematic diagram of a relationship of two adjacent sleeves according to an embodiment of the present disclosure.

Referring to FIG. 2, FIG. 2 is a schematic diagram of a sheathing relationship of two adjacent sleeves according to the present disclosure. As shown in FIG. 2, the first sleeve 201 and the second sleeve 202 are adjacent to each other, the first sleeve 201 may be sheathed inside the second sleeve 202, or the second sleeve 202 is sheathed inside the first sleeve 201, the first sleeve 201 is a sleeve formed by a side wall AED, a side wall EJHD, and a side wall FJH, and the second sleeve 202 is a sleeve formed by a side wall ACB, a side wall CIGB, and a side wall FIG.

In the embodiment of FIG. 2, the first side wall of the first sleeve 201 may be any one of the side wall AED, the side wall EJHD, or the side wall FJH. When the first side wall is the side wall AED, the second sleeve 202 is the side wall ACB; when the first side wall is the side wall EJHD, the second sleeve 202 is the side wall CIGB; and when the first side wall is the side wall FJH, the second sleeve 202 is the side wall FIG.

The side wall EJHD may be provided with the first metal plate, the side wall CIGB may be provided with the second metal plate, the first metal plate is opposite to the second metal plate, and the first metal plate and the second metal plate have overlapped orthogonal projection areas.

An electrical signal may be applied to at least one of the first metal plate and the second metal plate. When the first sleeve 201 and the second sleeve 202 move relative to each other, the overlapped orthogonal projection areas of the first metal plate and the second metal plate change, and consequently an electrical signal between the first metal plate and the second metal plate changes. The electrical signal between the first metal plate and the second metal plate may be detected, so that an angle of relative movement between the first sleeve and the second sleeve is determined. Therefore, a folding angle corresponding to the hinge having the N sleeves is determined according to the angle of the relative movement between adjacent sleeves. When the first screen and the second screen are connected through the hinge, the electronic device provided with the first screen and the second screen may be controlled according to the folding angle of the hinge. For example, the electronic device may be controlled according to the hinge in at least one of the following manners: controlling a volume of the electronic device; controlling screen brightness of the electronic device; switching a display interface of the electronic device; or controlling an application interface running on the electronic device.

Optionally, the first sleeve is sheathed inside the second sleeve, the first side wall is an outer side wall of the first sleeve, the second side wall is an inner side wall of the second sleeve, a first side end of the first metal plate is provided with a first contact, a first side end of the second metal plate is provided with a second contact, the first contact may move along the second metal plate, and the second contact may move along the first metal plate.

Figure 3:
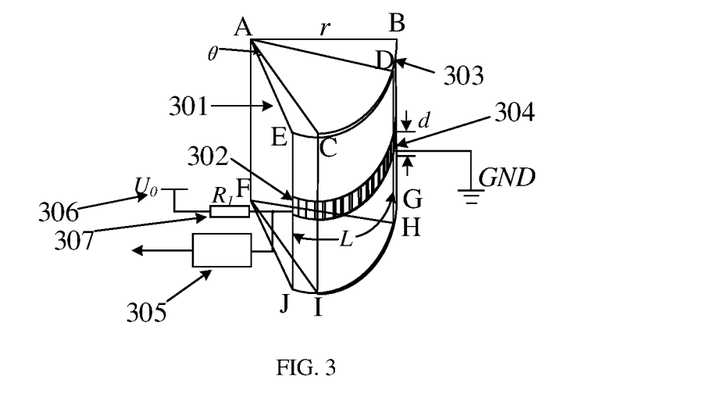
FIG. 3 is a second schematic diagram of a relationship of two adjacent sleeves according to an embodiment of the present disclosure.

Referring to FIG. 3, FIG. 3 is a second schematic diagram of a relationship of two adjacent sleeves according to an embodiment of the present disclosure. As shown in FIG. 3, two adjacent sleeves are a first sleeve 301 and a second sleeve 303, and the first sleeve 301 is sheathed inside the second sleeve 303.

The first sleeve 301 is a sleeve formed by a side wall AED, a side wall EJHD, and a side wall FJH, and the second sleeve 303 is a sleeve formed by a side wall ACB, a side wall CIGB, and a side wall FIG. The first side wall may be an outer side wall of any one of the side wall AED, the side wall EJHD, or the side wall FJH included by the first sleeve 301. Correspondingly, when the first side wall is an outer side wall of the side wall AED, the second sleeve 303 is an inner side wall of the side wall ACB; when the first side wall is an outer side wall of the side wall EJHD, the second sleeve 303 is an inner side wall of the side wall CIGB; and when the first side wall is an outer side wall of the side wall FJH, the second sleeve 303 is an inner side wall of the side wall FIG.

As shown in FIG. 3, the outer side wall of the side wall EJHD of the first sleeve 301 is provided with the first metal plate 302, the inner side wall of the side wall CIGB of the second sleeve 303 is provided with the second metal plate 304, and the first metal plate 302 is opposite to the second metal plate 304. A first side end of the first metal plate 302 is provided with a first contact, a first side end of the second metal plate 304 is provided with a second contact, the first contact may move along the second metal plate 304, and the second contact may move along the first metal plate 302. The first metal plate 302 and the second metal plate 304 have overlapped orthogonal projection areas. The first metal plate 302 and the second metal plate 304 may move relative to each other, so that the orthogonal projection areas may be adjusted. As the orthogonal projection areas increase or decrease, a resistance between the first metal plate 302 and the second metal plate 304 changes, and consequently the electrical signal between the first metal plate and the second metal plate changes. It is further noted that metal parts that generate the overlapped orthogonal projection areas in the first metal plate 302 and the second metal plate 304 are metal parts that are connected in parallel between the first metal plate 302 and the second metal plate 304 through the first contact and the second contact.

Optionally, a second side end of the first metal plate is electrically connected to a first power source through a load, a second side end of the second metal plate is grounded, and the second side end of the first metal plate is also electrically connected to a first electrical signal detector.

Referring to FIG. 3 again, as shown in FIG. 3, a second side end of the first metal plate 302 is electrically connected to a first power source 306 through a load 307, a second side end of the second metal plate 304 is grounded, and the second side end of the first metal plate 302 is also electrically connected to a first electrical signal detector 305. It is further noted that the second side end of the first metal plate 302 is connected to a collection end of the first electrical signal detector 305, and an output end of the first electrical signal detector 305 may be connected to a processor and transmits a collected electrical signal to the processor for further processing by the processor. It may be understood that the first electrical signal detector 305 may be an analog-to-digital converter, and the electrical signal collected by the first electrical signal detector 305 may include a voltage signal and/or a current signal or the like.

In FIG. 3, the length of the first metal plate 302 is indicated by L, the width of the first metal plate 302 is indicated by d, the thickness of the first metal plate 302 is indicated by a, the radius of the sleeve is indicated by r, and an extended angle between the first sleeve 301 and the second sleeve 303 is indicated by θ. When the hinge includes the N sleeves, a value range of θ is 0≤θ≤180/(N−1). A voltage of the first power source is indicated by $U_0$, a load is indicated by $R_1$, a voltage collected by the first electrical signal detector 305 is indicated by V, and resistivity of the first metal plate and the second metal plate is indicated by ρ. In this case, $U_0$ and V satisfy the following relationship formula (1):

$$V = U_0 \frac{2\frac{\rho\theta r}{da} + \frac{\rho r}{2da}\left(\frac{180°}{N-1} - \theta\right)}{R_1 + 2\frac{\rho\theta r}{da} + \frac{\rho r}{2da}\left(\frac{180°}{N-1} - \theta\right)}.$$

It is further noted that when the extended angle between the first sleeve 301 and the second sleeve 303 is θ, θr indicates the length of the first metal part corresponding to a non-overlapped area other than an area that is of the orthogonal projection area of the first metal plate 302 and that overlaps the orthogonal projection area of the second metal plate 304, or θr indicates the length of the second metal part corresponding to a non-overlapped area other than an area that is of the orthogonal projection area of the second metal plate 304 and that overlaps the orthogonal projection area of the first metal plate 302.

$$2\frac{\rho\theta r}{da}$$

indicates a sum of resistance values of the first metal part and the second metal part, $$\frac{180°}{(N-1)} - \theta$$

indicates an overlapped angle between the first sleeve 301 and the second sleeve 303, $$r\left(\frac{180°}{N-1} - \theta\right)$$

indicates the length of the third metal part corresponding to the area that is of the orthogonal projection area of the first metal plate 302 and that overlaps the orthogonal projection area of the second metal plate 304, $$r\left(\frac{180°}{N-1} - \theta\right)$$

indicates the length of the fourth metal part corresponding to the area that is of the orthogonal projection area of the second metal plate 304 and that overlaps the orthogonal projection area of the first metal plate 302, and $$\frac{\rho r}{2da}\left(\frac{180°}{N-1} - \theta\right)$$

indicates a value of a resistor connected in parallel between the third metal part and the fourth metal part.

The following relationship formula (2):

$$(N-1)\theta = \frac{2V(N-1)R_1 da}{3(U_0 - V)\rho r} - 60$$

may be deduced according to the relationship formula (1), where (N−1)θ indicates the folding angle of the hinge.

It may be understood that the folding angle of the hinge may be calculated according to current values that flow through the first metal plate 302 and the second metal plate 304 and collected by the first electrical signal detector 305, or the folding angle of the hinge may be calculated according to resistance values of the first metal plate 302 and the second metal plate 304 that are collected by the first electrical signal detector 305. A specific calculation process may be similar to the deduction process of calculating the folding angle according to a collected voltage value. Details are not described herein again.

In this way, the folding angle of the hinge may be determined according to movement between the first metal plate and the second metal plate, to improve precision of the folding angle.

Optionally, there is a gap between the first metal plate and the second metal plate.

Figure 4:
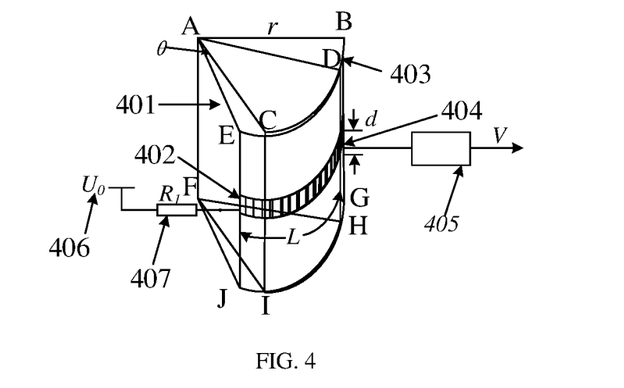
FIG. 4 is a third schematic diagram of a relationship of two adjacent sleeves according to an embodiment of the present disclosure.

Referring to FIG. 4, FIG. 4 is a third schematic diagram of a relationship of two adjacent sleeves according to an embodiment of the present disclosure. As shown in FIG. 4, two adjacent sleeves are a first sleeve 401 and a second sleeve 403. The first sleeve 401 may be sheathed inside the second sleeve 403, or the second sleeve 403 may be sheathed inside the first sleeve 401.

The first sleeve 401 is a sleeve formed by a side wall AED, a side wall EJHD, and a side wall FJH, and the second sleeve 403 is a sleeve formed by a side wall ACB, a side wall CIGB, and a side wall FIG. The first side wall is any one of the side wall AED, the side wall EJHD, or the side wall FJH included by the first sleeve 401. Correspondingly, when the first side wall is the side wall AED, the second sleeve 403 is the side wall ACB; when the first side wall is the side wall EJHD, the second sleeve 403 is the side wall CIGB; and when the first side wall is the side wall FJH, the second sleeve 403 is the side wall FIG.

As shown in FIG. 4, the side wall EJHD of the first sleeve 401 is provided with the first metal plate 402, the side wall CIGB of the second sleeve 403 is provided with the second metal plate 404, the first metal plate 402 is opposite to the second metal plate 404, and there is a gap between the first metal plate 402 and the second metal plate 404.

Optionally, the gap between the first metal plate and the second metal plate is filled with an electrical medium.

Referring to FIG. 4 again, the gap between the first metal plate 402 and the second metal plate 404 is filled with an electrical medium. The first metal plate 402, the second metal plate 404, and the electrical medium may be equivalent to capacitor devices. It may be understood that the electrical medium is a material with resistivity more than 10 ohm/cm. The electrical medium includes a wide range of substances including gaseous, liquid, and solid substances, and also includes vacuum.

Optionally, a first target metal plate is electrically connected to a second power source, a second target metal plate is electrically connected to a second electrical signal detector, the first target metal plate is any one of the first metal plate and the second metal plate, and the second target metal plate is one of the first metal plate and the second metal plate other than the first target metal plate.

Referring to FIG. 4 again, as shown in FIG. 4, the first metal plate 402 is electrically connected to a second power source 406 through a load 407, and the second metal plate 404 is electrically connected to a second electrical signal detector 405. It is further noted that the first metal plate 402 may be directly electrically connected to the second power source 406, and the load 407 is connected to reduce a voltage to ensure that the device is not damaged by overvoltage. A collection end of the second electrical signal detector 405 is connected to the second metal plate 404, and an output end of the second electrical signal detector 405 may be connected to a processor and transmits a collected electrical signal to the processor for further processing by the processor. It may be understood that the second electrical signal detector 405 may be an analog-to-digital converter, and the electrical signal collected by the first electrical signal detector 305 may include a voltage signal.

In FIG. 4, the length of the first metal plate 402 is indicated by L, the width of the first metal plate 402 is indicated by d, the thickness of the electrical medium is indicated by $a_1$, the radius of the sleeve is indicated by r, and an extended angle between the first sleeve 401 and the second sleeve 403 is indicated by θ. When the hinge includes the N sleeves, the hinge needs to be folded by 180° from the extended state to the completely folded state. Therefore, a value range of θ is 0≤θ≤180/(N−1). A voltage of the second power source is indicated by $U_0$, the second power source supplies power $U_0$ to the first metal plate, an electricity quantity applied to the first metal plate is indicated by Q, a load is indicated by $R_1$, a voltage collected by the second electrical signal detector 405 is indicated by V, and the electrical medium of the first metal plate and the second metal plate is indicated by ε. κ indicates an electrostatic force constant. In this case, $U_0$ and V satisfy the following relationship formula (3):

$$V = \frac{4\pi k a_1 Q}{\varepsilon r d\left(\frac{180°}{N-1} - \theta\right)}.$$

It is further noted that $$\left(\frac{180°}{(N-1)} - \theta\right)$$

indicates an overlapped angle between the first sleeve 401 and the second sleeve 403, $$r\left(\frac{180°}{N-1} - \theta\right)$$

indicates the length of the third metal part corresponding to the area that is of the orthogonal projection area of the first metal plate 402 and that overlaps the orthogonal projection area of the second metal plate 404, and $$r\left(\frac{180°}{N-1} - \theta\right)$$

indicates the length of the fourth metal part corresponding to the area that is of the orthogonal projection area of the second metal plate 304 and that overlaps the orthogonal projection area of the first metal plate 302. The capacitance value of an equivalent device of the first metal plate 402 and the second metal plate 404 is $$\frac{\varepsilon r d\left(\frac{180°}{N-1} - \theta\right)}{4\pi k a_1}.$$

Therefore, according to the relationship between the electric quantity, the capacitance, and the voltage, it may be deduced that the electric quantity Q and the voltage value V collected by the second electrical signal detector 405 satisfy the relationship shown in relationship formula (3).

The following relationship formula (4):

$$(N-1)\theta = 180° - \frac{4\pi(N-1)ka_1 Q}{\varepsilon r d V}$$

may be deduced according to the relationship formula (3), where (N−1)θ indicates the folding angle of the hinge.

In this way, the first metal plate and the second metal plate are not in contact with each other. This avoids that relative movement between the first metal plate and the second metal plate results in abrasion of the first metal plate and the second metal plate, and improves the service life of the first metal plate and the second metal plate.

It is further noted that for the third sleeve 1033 and the fourth sleeve 1034 shown in FIG. 1, the electrical signal between the third metal plate and the fourth metal plate may also be detected in a manner that is the same as or similar to the foregoing manner, so that an angle of relative movement between the third sleeve 1033 and the fourth sleeve 1034 is determined. Therefore, a folding angle corresponding to the hinge having the N sleeves is determined according to the angle of the relative movement between adjacent sleeves.

To improve precision of the folding angle, according to the manner of mounting the first metal plate and the second metal plate in the embodiment shown in FIG. 1, M pairs of metal plates may be separately mounted on M pairs of adjacent inner and outer sleeves, to obtain electrical signals between the M pairs of metal plates. According to the manner described in the embodiment, M folding angles may be determined according to the electrical signals between the M pairs of metal plates, and the average of the M folding angles is used as the folding angle of the hinge.

For example, the average of the folding angle determined according to the electrical signal between the first metal plate and the second metal plate and the folding angle determined according to the electrical signal between the third metal plate and the fourth metal plate is used as the folding angle of the hinge. In this way, the average folding angle is calculated, so that precision of the folding angle of the hinge can be improved.

In the embodiments of the present disclosure, the folding angle of the hinge may be determined according to the electrical signal between the first metal plate and the second metal plate of the hinge, and the folding angle is highly accurate.

The embodiments of the present disclosure further provide an electronic device, including a first substrate and a second substrate, where the first substrate and the second substrate are connected through the foregoing hinge.

Optionally, the first substrate is provided with a first screen, and the second substrate is provided with a second screen.

In the embodiments, the electronic device detects the electrical signal between the first metal plate and the second metal plate of the hinge, so that an angle of relative movement between the first sleeve and the second sleeve is determined. Therefore, a folding angle corresponding to the hinge having the N sleeves is determined according to the angle of the relative movement between adjacent sleeves. When the first screen and the second screen are connected through the hinge, the electronic device may be controlled according to the folding angle of the hinge.

For example, the electronic device may be controlled according to the hinge in at least one of the following manners: controlling a volume of the electronic device; controlling screen brightness of the electronic device; switching a display interface of the electronic device; or controlling an application interface running on the electronic device.

In the embodiments of the present disclosure, the electronic device determines the folding angle of the hinge according to the electrical signal between the first metal plate and the second metal plate of the hinge. The obtained folding angle is highly accurate. The electronic device may be controlled according to the folding angle. Therefore, the application scope of controlling and managing the electronic device through the folding operation is expanded, so that the folding operation can implement more application management functions.

Figure 5:
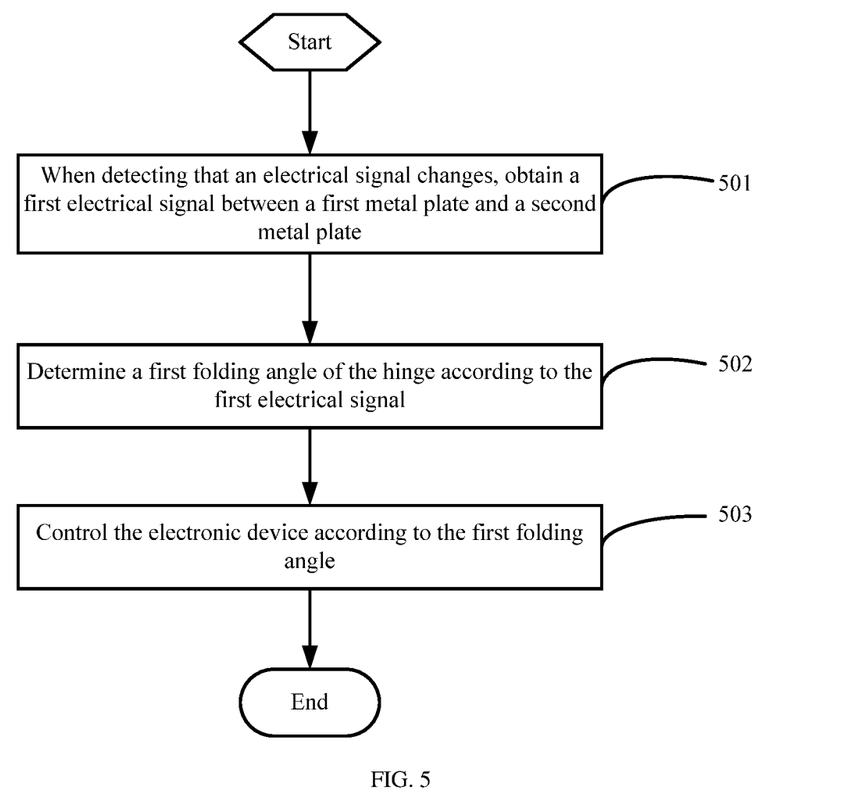
FIG. 5 is a flowchart of an electronic device control method according to an embodiment of the present disclosure.

Referring to FIG. 5, FIG. 5 is a flowchart of an electronic device control method according to an embodiment of the present disclosure. The electronic device control method shown in FIG. 5 can be applied to the foregoing electronic device. As shown in FIG. 5, the electronic device control method includes the following steps:

Step 501: When detecting that an electrical signal changes, obtain a first electrical signal between a first metal plate and a second metal plate.

In this embodiment, because the electrical signal between the first metal plate and the second metal plate changes during the contraction process of the hinge, different contraction degrees may generate different folding angles, and the corresponding electrical signals are also different. Therefore, the first electrical signal between the first metal plate and the second metal plate can be obtained when it is detected that the electrical signal changes.

Step 502: Determine a first folding angle of the hinge according to the first electrical signal.

In this embodiment, the first folding angle can be determined by referring to the foregoing detailed description of the hinge and the electronic device. To avoid repetition, details are not repeated herein.

Step 503: Control the electronic device according to the first folding angle. In this embodiment, the controlling the electronic device includes controlling at least one of the following:

controlling a volume of the electronic device; controlling screen brightness of the electronic device; switching a display interface of the electronic device; or controlling an application interface running on the electronic device.

For example, a larger folding angle corresponds to a higher volume and a smaller folding angle corresponds to a lower volume; a larger folding angle corresponds to higher brightness of the screen and a smaller folding angle corresponds to lower brightness of the screen; when the folding angle is higher than a preset value, switch to the first screen; and when the folding angle is lower than a preset value, switch to the second screen; when the folding angle is within a first preset interval, an application interface that runs is displayed in full screen; and when the folding angle is within a second preset interval, an application interface that runs is exited.

In the embodiments of the present disclosure, the folding angle of the hinge is determined according to the electrical signal between the first metal plate and the second metal plate of the hinge. The obtained folding angle is highly accurate. The electronic device may be controlled according to the folding angle. Therefore, the application scope of controlling and managing the electronic device through the folding operation is expanded, so that the folding operation can implement more application management functions.

Figure 6:
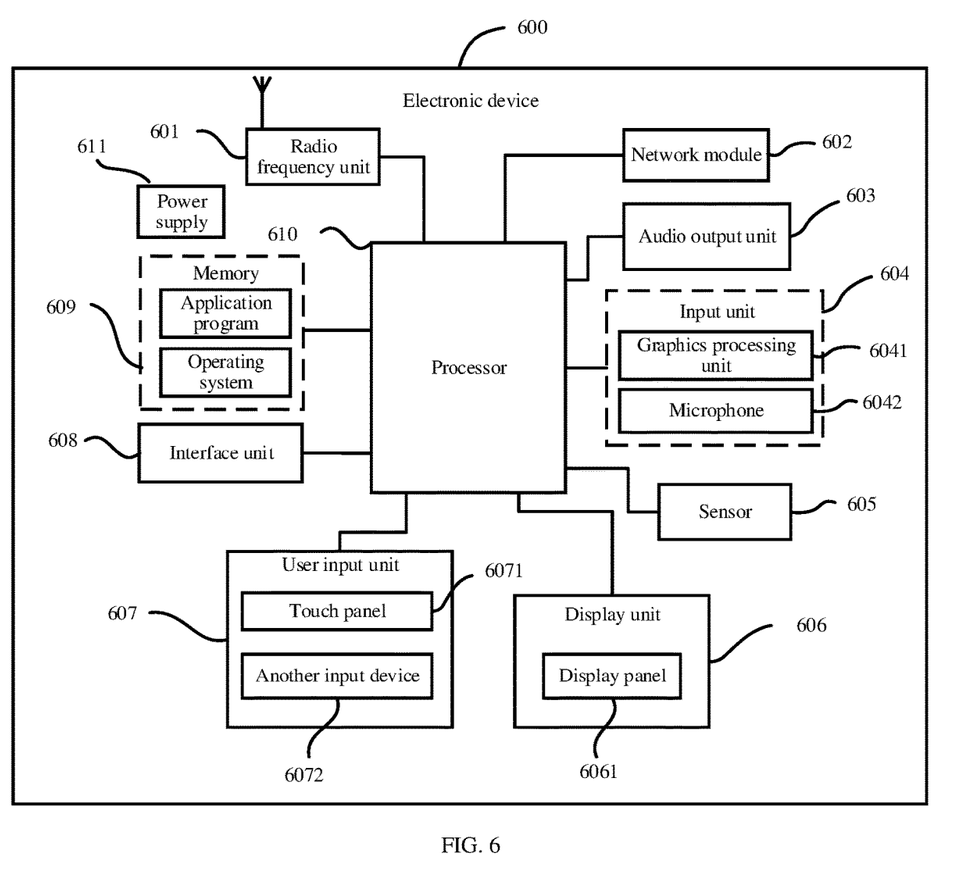
FIG. 6 is a structural diagram of an electronic device according to an embodiment of the present disclosure.

FIG. 6 is a schematic structural diagram of hardware of an electronic device implementing embodiments of the present disclosure. The electronic device 600 includes, but is not limited to: a radio frequency unit 601, a network module 602, an audio output unit 603, an input unit 604, a sensor 605, a display unit 606, a user input unit 607, an interface unit 608, a memory 609, a processor 610, a power supply 611, and other components. The electronic device 600 further includes a first substrate and a second substrate, where the first substrate and the second substrate are connected through the foregoing hinge. The first substrate is provided with a first screen, and the second substrate is provided with a second screen. A person skilled in the art may understand that the structure of the electronic device shown in FIG. 6 constitutes no limitation on the electronic device. The electronic device may include more or fewer components than those shown in the figure, or a combination of some components, or an arrangement of different components. In this embodiment of the present disclosure, the electronic device includes, but is not limited to, a mobile phone, a tablet computer, a notebook computer, a palmtop computer, a vehicle-mounted terminal, a wearable device, a pedometer, or the like.

The processor 610 is configured to: when detecting that an electrical signal changes, obtain a first electrical signal between a first metal plate and a second metal plate; determine a first folding angle of a hinge according to the first electrical signal; and control the electronic device according to the first folding angle.

Optionally, the processor 610 controls the electronic device in at least one of the following manners: controlling a volume of the electronic device; controlling screen brightness of the electronic device; switching a display interface of the electronic device; or controlling an application interface running on the electronic device.

The electronic device 600 can implement each process implemented by the electronic device in the foregoing embodiments. To avoid repetition, details are not described herein again.

In the embodiments of the present disclosure, the electronic device 600 determines the folding angle of the hinge according to the electrical signal between the first metal plate and the second metal plate of the hinge. The obtained folding angle is highly accurate. The electronic device is controlled according to the folding angle. Therefore, the application scope of controlling and managing the electronic device through the folding operation can be expanded, so that the folding operation can implement more application management functions.

It should be understood that, in this embodiment of the present disclosure, the radio frequency unit 601 may be configured to receive and transmit information, or receive and transmit signals during a call. Specifically, the radio frequency unit 601 receives downlink data from a base station, and transmits the downlink data to the processor 610 for processing; and in addition, transmits uplink data to the base station. Generally, the radio frequency unit 601 includes but is not limited to an antenna, at least one amplifier, a transceiver, a coupler, a low noise amplifier, a duplexer, and the like. In addition, the radio frequency unit 601 can also communicate with another device through a wireless communications system and network.

The electronic device provides users with wireless broadband Internet access through the network module 602, for example, helps users receive and send e-mails, browse web pages, and access streaming media.

The audio output unit 603 can convert audio data received by the radio frequency unit 601 or the network module 602 or stored in the memory 609 into an audio signal, and output the audio signal into sound. Moreover, the audio output unit 603 can further provide audio output related to a specific function performed the electronic device 600 (for example, call signal receiving sound and message receiving sound). The audio output unit 603 includes a speaker, a buzzer, a telephone receiver, and the like.

The input unit 604 is configured to receive audio or video signals. The input unit 604 may include a graphics processing unit (GPU) 6041 and a microphone 6042. The graphics processing unit 6041 processes image data of a static picture or a video obtained by an image capturing apparatus (for example, a camera) in a video capturing mode or an image capturing mode. A processed image frame can be displayed on the display unit 606. The image frame processed by the graphics processing unit 6041 can be stored in the memory 609 (or another storage medium) or sent via the radio frequency unit 601 or the network module 602. The microphone 6042 can receive sound and can process such sound into audio data. The audio data obtained through processing may be converted, in a telephone call mode, into a format that can be sent to a mobile communications base station via the radio frequency unit 601 for output.

The electronic device 600 further includes at least one sensor 605, for example, a light sensor, a motion sensor, and another sensor. Specifically, the light sensor includes an ambient light sensor and a proximity sensor. The ambient light sensor can adjust brightness of a display panel 6061 according to ambient light brightness. The proximity sensor can switch off the display panel 6061 and/or backlight when the electronic device 600 moves close to an ear. As a motion sensor, an accelerometer sensor may detect the magnitude of acceleration in various directions (usually three axes), may detect the magnitude and the direction of gravity when being stationary, may be configured to identify a posture of the electronic device (such as switching between a portrait mode and a landscape mode, related games, and magnetometer posture calibration), may perform functions related to vibration identification (such as a pedometer and a knock), and the like. The sensor 605 may further include a fingerprint sensor, a pressure sensor, an iris sensor, a molecular sensor, a gyroscope, a barometer, a hygrometer, a thermometer, an infrared sensor, or the like. Details are not described herein.

The display unit 606 is configured to display information entered by a user or information provided for the user. The display unit 606 may include the display panel 6061, and the display panel 6061 may be configured in a form of a liquid crystal display (LCD), an organic light-emitting diode (OLED), or the like.

The user input unit 607 can be configured to receive entered number or character information, and generate key signal input related to user settings and function control of the electronic device. Specifically, the user input unit 607 includes a touch panel 6071 and another input device 6072. The touch panel 6071, also called a touch screen, can collect a touch operation of the user on or near the touch panel 6071 (for example, an operation performed by the user with any suitable object or accessory such as a finger or a stylus on or near the touch panel 6071). The touch panel 6071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, sends the contact coordinates to the processor 610, and receives and executes a command sent by the processor 610. In addition, the touch panel 6071 can be implemented in various types such as resistive, capacitive, infrared, and surface acoustic waves. In addition to the touch panel 6071, the user input unit 607 may further include the another input device 6072. Specifically, the another input device 6072 may include, but is not limited to, a physical keyboard, function keys (such as a volume control key and a switch key), a trackball, a mouse, and a joystick. Details are not described herein.

Further, the touch panel 6071 can cover the display panel 6061. When detecting a touch operation on or near the touch panel 6071, the touch panel 6071 transmits the touch operation to the processor 610 to determine a type of a touch event. Then the processor 610 provides corresponding visual output on the display panel 6061 based on the type of the touch event. Although in FIG. 6, the touch panel 6071 and the display panel 6061 are configured as two independent components to implement input and output functions of the electronic device, in some embodiments, the touch panel 6071 and the display panel 6061 can be integrated to implement the input and output functions of the electronic device. Details are not limited herein.

The interface unit 608 is an interface for connecting an external apparatus and the electronic device 600. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, a headset port, and the like. The interface unit 608 can be configured to receive input from an external apparatus (for example, data information and power) and transmit the received input to one or more elements in the electronic device 600, or can be configured to transmit data between the electronic device 600 and the external apparatus.

The memory 609 may be configured to store a software program and various data. The memory 609 may mainly include a program storage area and a data storage area. The program storage area may store an operating system, an application program required by at least one function (such as a sound playback function and an image playback function), and the like. The data storage area may store data (such as audio data and a phone book) created based on the use of the mobile phone, and the like. In addition, the memory 609 may include a high-speed random-access memory or a nonvolatile memory, for example, at least one disk storage device, a flash memory, or another volatile solid-state storage device.

The processor 610 is a control center of the electronic device and connects all parts of the electronic device by using various interfaces and circuits. By running or executing software programs and/or modules stored in the memory 609 and by calling data stored in the memory 609, the processor 610 implements various functions of the electronic device and processes data, thus performing overall monitoring on the electronic device. The processor 610 may include one or more processing units. Optionally, the processor 610 may integrate an application processor and a modem processor. The application processor mainly processes an operating system, a user interface, an application program, and the like. The modem processor mainly processes wireless communication. It may be understood that the foregoing modem processor may not be integrated into the processor 610.

The electronic device 600 may further include the power supply 611 (such as a battery) supplying power to each component. Preferably, the power supply 611 may be logically connected to the processor 610 by using a power management system, so as to implement functions such as charging management, discharging management and power consumption management by using the power management system.

In addition, the electronic device 600 includes some functional modules not shown. Details are not described herein.

Optionally, an embodiment of the present disclosure further provides an electronic device, including a processor 610, a memory 609, and a computer program stored in the memory 609 and capable of running on the processor 610. When the computer program is executed by the processor 610, the processes of the foregoing embodiments of the electronic device control method are implemented, and the same technical effects can be achieved. To avoid repetition, details are not described herein again.

An embodiment of the present disclosure further provides a computer readable storage medium. The computer readable storage medium stores a computer program, the computer program, when executed by a processor, implements the processes of the foregoing embodiments of the electronic device control method, and the same technical effects can be achieved. To avoid repetition, details are not described herein again. The computer readable storage medium is, for example, a read-only memory (ROM), a random-access memory (RAM), a magnetic disk, or an optical disc.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. Without being subject to further limitations, an element defined by a phrase "including a . . . " does not exclude presence of other identical elements in the process, method, article, or apparatus that includes the very element.

By means of the foregoing description of the implementations, a person skilled in the art may clearly understand that the method in the foregoing embodiments may be implemented by software with a necessary general hardware platform. Certainly, the method in the foregoing embodiments may also be implemented by hardware. However, in many cases, the former is a preferred implementation. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skills in the art may make many forms without departing from the aims of the present disclosure and the protection scope of claims, all of which fall within the protection of the present disclosure.

What is claimed is:

1. A hinge, comprising N sleeves that are jointed, wherein any two adjacent sleeves of the N sleeve may be sheathed together, and N is a positive integer greater than or equal to 2;
   a first side wall of a first sleeve is provided with a first metal plate, a second side wall of a second sleeve is provided with a second metal plate, and the first sleeve and the second sleeve are two adjacent sleeves;
   when the first sleeve and the second sleeve are sheathed, the first side wall is opposite to the second side wall and the first metal plate is opposite to the second metal plate, and the first metal plate and the second metal plate have overlapped orthogonal projection areas; and
   an electrical signal is applied to at least one of the first metal plate and the second metal plate, wherein when the first sleeve and the second sleeve move relative to each other, the electrical signal between the first metal plate and the second metal plate changes.

2. The hinge according to claim 1, wherein the first sleeve is sheathed inside the second sleeve, the first side wall is an outer side wall of the first sleeve, the second side wall is an inner side wall of the second sleeve, a first side end of the first metal plate is provided with a first contact, a first side end of the second metal plate is provided with a second contact, the first contact may move along the second metal plate, and the second contact may move along the first metal plate.

3. The hinge according to claim 2, wherein a second side end of the first metal plate is electrically connected to a first power source through a load, a second side end of the second metal plate is grounded, and the second side end of the first metal plate is also electrically connected to a first electrical signal detector.

4. The hinge according to claim 1, wherein there is a gap between the first metal plate and the second metal plate.

5. The hinge according to claim 4, wherein the gap between the first metal plate and the second metal plate is filled with an electrical medium.

6. The hinge according to claim 4, wherein a first target metal plate is electrically connected to a second power source, a second target metal plate is electrically connected to a second electrical signal detector, the first target metal plate is any one of the first metal plate and the second metal plate, and the second target metal plate is one of the first metal plate and the second metal plate other than the first target metal plate.

7. An electronic device, comprising a first substrate, a second substrate, and a hinge, wherein the first substrate and the second substrate are connected through the hinge, and the hinge comprises N sleeves that are joined, any two adjacent sleeves of the N sleeves may be sheathed together, and N is a positive integer greater than or equal to 2;
   a first side wall of a first sleeve is provided with a first metal plate, a second side wall of a second sleeve is provided with a second metal plate, and the first sleeve and the second sleeve are two adjacent sleeves;
   when the first sleeve and the second sleeve are sheathed, the first side wall is opposite to the second side wall and the first metal plate is opposite to the second metal plate, and the first metal plate and the second metal plate have overlapped orthogonal projection areas; and
   an electrical signal is applied to at least one of the first metal plate and the second metal plate, wherein when the first sleeve and the second sleeve move relative to each other, the electrical signal between the first metal plate and the second metal plate changes.

8. The electronic device according to claim 7, wherein the first substrate is provided with a first screen, and the second substrate is provided with a second screen.

9. An electronic device control method, applied to the electronic device according to claim 7, wherein the method comprises:
   when detecting that an electrical signal changes, obtaining a first electrical signal between a first metal plate and a second metal plate; and
   determining a first folding angle of a hinge according to the first electrical signal; and controlling the electronic device according to the first folding angle.

10. The electronic device control method according to claim 9, wherein the controlling the electronic device comprises controlling at least one of the following:
    controlling a volume of the electronic device; controlling screen brightness of the electronic device; switching a display interface of the electronic device; or controlling an application interface running on the electronic device.

11. An electronic device, comprising a processor, a memory, and a computer program stored in the memory and capable of running on the processor, wherein when the computer program is executed by the processor, steps of the electronic device control method according to claim 9 are implemented.

12. A non-transitory computer readable storage medium storing therein a computer program, wherein the computer program, when executed by a processor, implements steps of the electronic device control method according to claim 9.

* * * * *